United States Patent
Choi et al.

(10) Patent No.: US 9,532,035 B2
(45) Date of Patent: Dec. 27, 2016

(54) IMAGING SYSTEM MOUNTED IN FLIGHT VEHICLE

(71) Applicant: National Institute of Meteorological Research, Jeju-do (KR)

(72) Inventors: Kyu Young Choi, Jeju-do (KR); Yong Hee Lee, Seoul (KR); Kwang Deuk Ahn, Jeju-do (KR); Hee Choon Lee, Seoul (KR)

(73) Assignee: National Institute of Meteorological Research, Jeju-do (KR)

( * ) Notice: Subject to any disclaimer, the term of this patent is extended or adjusted under 35 U.S.C. 154(b) by 0 days.

(21) Appl. No.: 14/988,856

(22) Filed: Jan. 6, 2016

(65) Prior Publication Data

US 2016/0173859 A1 Jun. 16, 2016

Related U.S. Application Data

(63) Continuation of application No. PCT/KR2014/012972, filed on Dec. 29, 2014.

(30) Foreign Application Priority Data

Dec. 27, 2013 (KR) .................. 10-2013-0164739

(51) Int. Cl.
*G01C 11/02* (2006.01)
*H04N 13/02* (2006.01)
(Continued)

(52) U.S. Cl.
CPC ........... *H04N 13/0296* (2013.01); *G01C 11/02* (2013.01); *G01W 1/00* (2013.01); *G01W 1/08* (2013.01); *H04N 13/0242* (2013.01)

(58) Field of Classification Search
CPC .............. H04N 13/0296; G03B 15/006; G06T 2207/10032
See application file for complete search history.

(56) References Cited

U.S. PATENT DOCUMENTS 4,543,603 A * 9/1985 Laures .................... F41G 7/222
348/145
5,129,600 A * 7/1992 Polites .................... B64G 1/22
244/173.1

(Continued)

FOREIGN PATENT DOCUMENTS

KR 100893556 B1 4/2009
KR 101214582 B1 12/2012

*Primary Examiner* — Christopher Findley
(74) *Attorney, Agent, or Firm* — Husch Blackwell LLP (57) ABSTRACT

An imaging system on an aerial vehicle, includes: a group of rotating camera including at least a first and a second rotating cameras on the aerial vehicle; and a control part which controls a first virtual rotation track of the first rotating camera and a second virtual rotation track of the second rotating camera and allows shots to be taken at multiple photograph-shooting points on the first virtual rotation track and the second virtual rotation track; wherein the control part controls a set of multiple photograph-shooting points on the first virtual rotation track and those on the second virtual rotation track to be substantially in a grid shape. Accordingly, a 3D image could be acquired by using the group of rotating cameras on the aerial vehicle during a relatively short endurance flight and more information on images created in such a method could be estimated.

11 Claims, 5 Drawing Sheets

(51) Int. Cl.
*G01W 1/00* (2006.01)
*G01W 1/08* (2006.01)

(56) References Cited

U.S. PATENT DOCUMENTS

| | | | | |
|---|---|---|---|---|
| 5,894,323 A * | 4/1999 | Kain | ............... | G01C 11/02 348/116 |
| 6,999,005 B2 * | 2/2006 | Okada | ............... | B64D 47/08 340/967 |
| 8,497,905 B2 * | 7/2013 | Nixon | ............... | G01C 11/06 348/143 |
| 8,520,079 B2 * | 8/2013 | Schultz | ............... | H04N 5/247 348/207.99 |
| 8,559,802 B1 * | 10/2013 | McClatchie | ............... | G03B 15/006 396/13 |
| 8,687,062 B1 * | 4/2014 | Reece | ............... | G05D 1/0094 248/323 |
| 2003/0044060 A1 * | 3/2003 | Martins | ............... | H04N 5/23238 382/154 |
| 2009/0249900 A1 * | 10/2009 | Tschaggeny | ............... | G01C 19/08 74/5.7 |
| 2013/0321395 A1 * | 12/2013 | Chen | ............... | G01C 21/26 345/419 |
| 2014/0340427 A1 * | 11/2014 | Baker | ............... | G06T 3/0062 345/641 |

* cited by examiner

IMAGING SYSTEM MOUNTED IN FLIGHT VEHICLE

CROSS REFERENCE TO RELATED APPLICATIONS

This application is a continuation of prior International Application PCT Application No. PCT/KR2014/012972 filed on Dec. 29, 2014, which claims the benefit of priority from Korean Patent Application No. 10-2013-0164739 filed on Dec. 27, 2013. The disclosures of International Application PCT Application No. PCT/KR2014/012972 and Korean Patent Application No. 10-2013-0164739 are incorporated herein by reference.

FIELD OF THE INVENTION

The present invention relates to an imaging system on an aerial vehicle; and more particularly, to the system for controlling a group of rotating cameras rotating elliptically on an axis to acquire meteorological data and implementing three-dimensional images by applying image processing technique to the acquired meteorological data.

BACKGROUND OF THE INVENTION

The best way to acquire meteorological data is to observe sky in an aircraft. In general, civil aircrafts fly stable courses at an altitude of 8 kilometers, which is the best height between high clouds and mesospheric clouds to observe cirrus and altocumulus. In other words, the clouds at higher places than civil aircrafts are a type of cirrus, and clouds formed below them, if any, are a type of altocumulus. Because cirrus and altocumulus actually look pretty much the same, clouds must be classified by referring to sizes of cloud fraction at the ground, but it is not easy to distinguish clouds which look alike but whose fraction sizes are somewhat different.

Therefore, weather centers in countries around the world operate high altitude, long endurance (HALE) unmanned aerial vehicles (UAVs) and make them perform a variety of observations while staying at the stratosphere at an altitude of about 20 kilometers for a long time. However, a propulsion system for HALE should provide stable performance under an extreme environment of the stratosphere and its long endurance should be verified. Besides, it is also necessary to minimize harmful exhaust gas in response to global warming phenomena. Since even HALE UAVs for meteorological observations are still currently at a continuous development stage, it is true that more focuses are on aerial vehicles themselves rather than imaging technologies.

Nevertheless, given that it is difficult to control the HALE UAVs and it takes relatively more costs and maintenance fees for them to take off once, a necessity of HALE UAVs for acquiring more images effectively in a short time increases.

SUMMARY OF THE INVENTION

It is an object of the present invention to provide an imaging system on an aerial vehicle which may acquire three dimensional images by using a group of rotating cameras rotating elliptically in center of an axis and estimate more information on meteorological data by using images crated by the group of rotating cameras during a relatively short endurance flight.

In accordance with one aspect of the present invention, there is provided an imaging system on an aerial vehicle, including: a group of rotating camera including at least a first and a second rotating cameras on the aerial vehicle; and a control part which controls a first virtual rotation track of the first rotating camera and a second virtual rotation track of the second rotating camera so as to partially overlap with each other and allows shots to be taken at multiple photograph-shooting points on the first virtual rotation track by the first rotating camera and at multiple photograph-shooting points on the second virtual rotation track by the second rotating camera; wherein the control part controls a set of multiple photograph-shooting points on the first virtual rotation track where shooting is made by the first rotating camera and those on the second virtual rotation track where shooting is done by the second rotating camera to be substantially in a grid shape.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
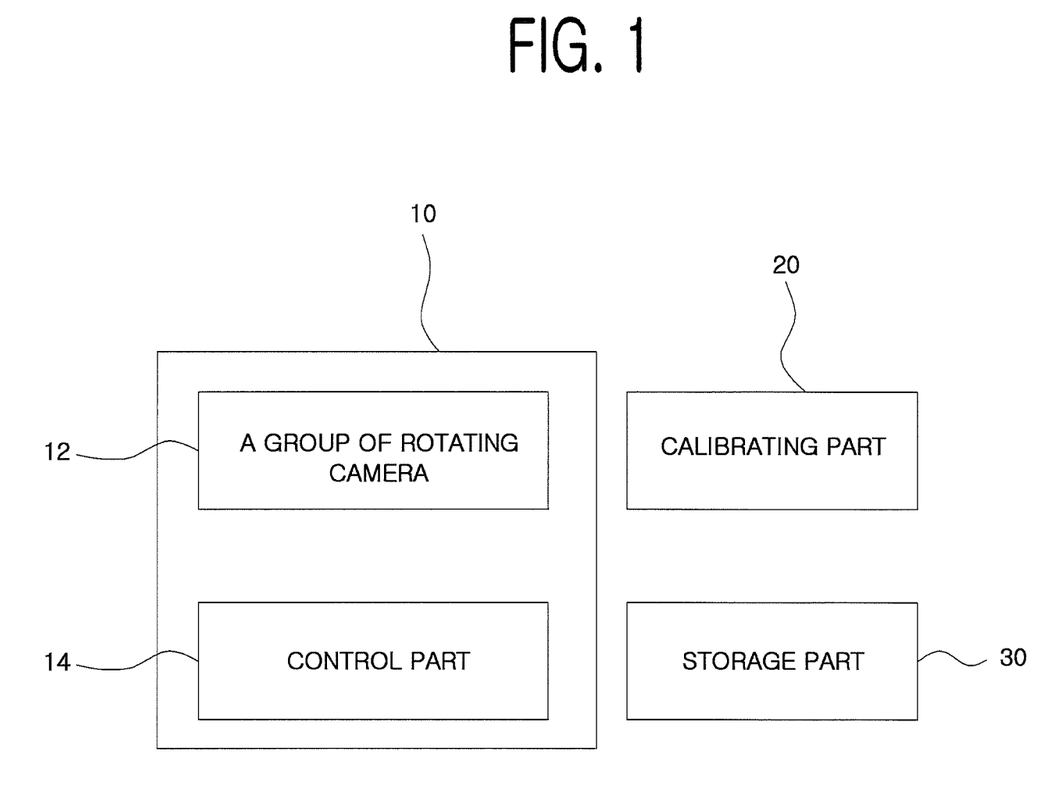
FIG. 1 is a schematic drawing showing a configuration of an imaging system on an aerial vehicle in accordance with one example embodiment of the present invention.

To allow those skilled in the art to the present invention to be carried out easily, the example embodiments of the present invention by referring to attached diagrams will be explained in detail as follows:

FIG. 1 is a schematic drawing showing a configuration of an imaging system on an aerial vehicle in accordance with one example embodiment of the present invention.

By referring to FIG. 1, the imaging system may include an images-acquiring part 10, a calibrating part 20, and a storage part 30. However, the calibrating part 20 and the storage part 30 are not always required to be included in the imaging system and they could be assumed to interact with the imaging system while they exist outside.

The images-acquiring part 10 may perform a function of taking shots of subject of meteorological observation, e.g., a cloud, a typhoon, a blizzard, etc., by using multiple rotating cameras during a flight of an unmanned aerial vehicle and allowing location information acquired through a location measuring module (non-illustrated) and information on shooting direction of each rotating camera to be transmitted to the storage part 30 and recorded therein. Herein, the images-acquiring part 10 allows respective rotating cameras to move along their assigned virtual rotation tracks and take shots at multiple points on the virtual rotation tracks, i.e., photograph-shooting points. Detailed explanation will be made on the virtual rotation tracks and the photograph-shooting points.

More specifically, the images-acquiring part 10 may include a group of rotating cameras 12, a control part 14, etc. In addition, a location measuring module, etc., which are not illustrated in figures below, may be further included. Herein, the group of rotating cameras 12 may include at least two rotating cameras.

The group of rotating cameras 12 may be installed on a part, e.g., a bottom section, of a body of a HALE unmanned aerial vehicle and the respective rotating cameras included in the group of rotating cameras 12 may perform rotary motions according to respective rotating shafts. If the group of rotating cameras 12 includes a first and a second rotating cameras, it could be assumed that they perform rotary motions while they move symmetrically. However, if the first and the second rotating cameras satisfy a condition under which shots are taken at specific points on virtual rotation tracks, it is not always necessary for both moving tracks of the cameras to be symmetrical. The multiple points where shots are taken will be explained later.

Additionally, the group of rotating cameras 12 may acquire their location information, i.e., information on location of the UAV in the sky, at a time of shooting from the location measuring module (non-illustrated), etc. and allow the control part 14 to control the group of rotating cameras 12 by referring to the location information acquired as such and information on direction of shooting. Herein, the meaning of "control" above includes a control of a motion of the respective rotating cameras along the virtual rotation tracks assigned thereto as well as a control of shooting at the specific points on the virtual rotation tracks.

Meteorological data, i.e., image data with respect to the cloud, the typhoon, the blizzard, etc., shot by the group of rotating cameras 12 and metadata, e.g., data on a location of the UAV and a shooting direction of the group of rotating cameras 12, corresponding to the meteorological data may be used to acquire 3D images regarding a central area in a shooting range and 2D images regarding surrounding areas in the shooting range through an image processing course. These will be explained in more details later.

The location measuring module (non-illustrated) may be attached to the body of the HALE unmanned aerial vehicle or to each rotating cameras included in the group 12 but it is not limited only to this.

The images-acquiring part 10 may include the location measuring module or interact therewith. If the group of rotating cameras 12 takes shots of a subject(s), the metadata (e.g., data on a location(s) and a shooting direction(s) of the group of rotating cameras 12) may be transmitted to the calibrating part 20. Herein, the location(s) of the group of rotating cameras 12 may be regarded as that of the UAV.

Next, the control part 14 may control the operations of the group of rotating cameras 12 by interacting therewith.

The control part 14 may allow 3D images and 2D images to be acquired by using images shot at photograph-shooting points on so-called virtual hetero straight lines and images shot at photograph-shooting points on so-called virtual homo straight lines, respectively. Herein, the virtual hetero straight line means a virtual straight line which is created by virtually connecting at least one photograph-shooting point on one virtual rotation track assigned to one rotating camera in the group 12 and at least one photograph-shooting point on another virtual rotation track assigned to another rotating camera in the group 12. Further, the virtual homo straight line means a virtual straight line which is created by virtually connecting at least two photograph-shooting points on a virtual rotation track assigned to a rotating camera in the group 12.

The control part 14 may include a control unit for controlling a rotating shaft capable of controlling the rotations of the cameras. To this end, it may further include a motor and a gear. It may also play a role in controlling the shooting of the cameras in the group 12 so as to at least partially overlap a shooting range(s) corresponding to an image(s) acquired at the photograph-shooting points on the virtual hetero straight lines with that corresponding to an image(s) acquired at the virtual homo straight lines. The virtual hetero straight lines and the virtual homo straight lines will be explained in more details later by referring to FIGS. 4 and 5.

The calibrating part 20 plays a role in calibrating a variety of parameters to synthesize images shot by the images-acquiring part 10 with a higher accuracy. For example, it could also calibrate variation of the acceleration among the respective rotating cameras and vibration of the aerial vehicle.

Lastly, the storage part 30 plays a role in storing data of many images shot on the virtual hetero straight lines and the virtual homo straight lines by the images-acquiring part 10, metadata (e.g., data on a location and a shooting direction of the group of rotating cameras 12), etc.

Figure 2:
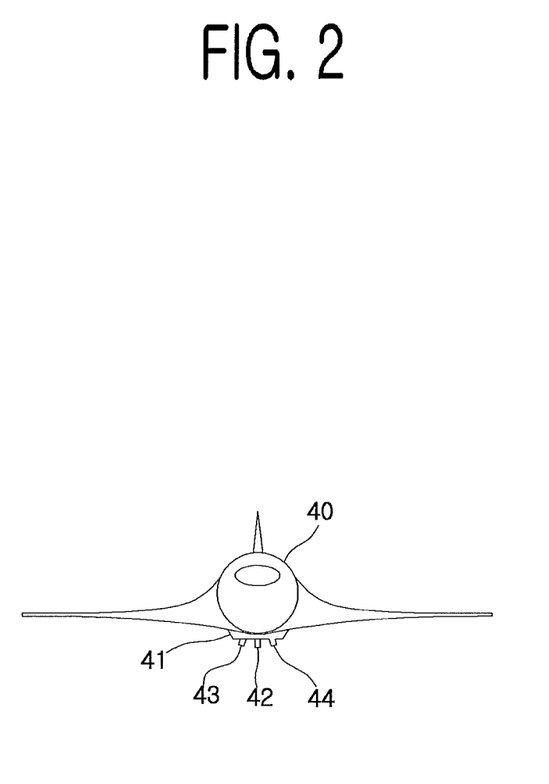
FIG. 2 shows a state of installation of a group of rotating cameras on the aerial vehicle in accordance with an example embodiment of the present invention.

FIG. 2 shows a state of installation of the group of rotating cameras on the aerial vehicle in accordance with an example embodiment of the present invention.

A base part 41 may be located on a part, e.g., a bottom section, of a body of an aerial vehicle 40 and have a function of installing the group of rotating cameras 12 thereon.

Unlike the example as shown above in FIG. 2, an explanation will be made on assumption that three rotating cameras are included in the group of rotating cameras 12.

By referring to FIG. 2, all the respective three rotating cameras disposed at appropriate intervals on the base part 41 may be controlled by the control part 14. Herein, location measuring modules could be attached respectively to a first rotating camera 43, a second rotating camera 44, and a third rotating camera 42.

Figure 3:
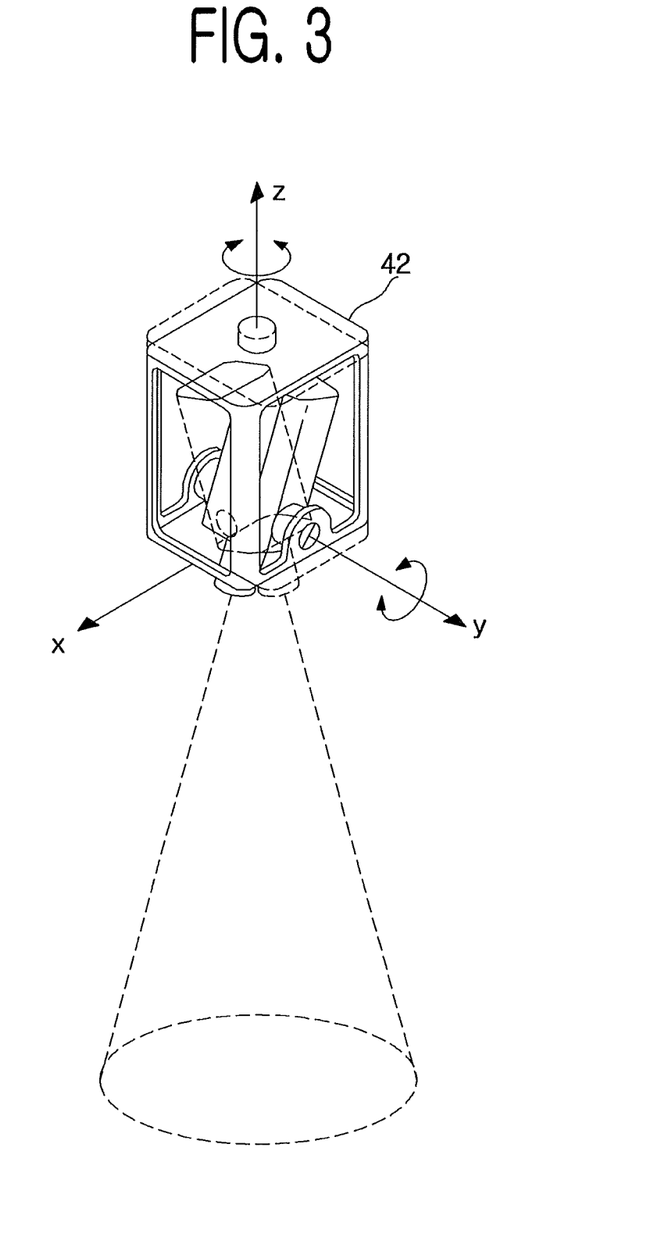
FIG. 3 illustrates a shooting range depending on a rotation of one of rotating cameras in accordance with an example embodiment of the present invention.

FIG. 3 illustrates a shooting range depending on a rotation of one of rotating cameras in accordance with an example embodiment of the present invention. The respective rotating cameras including the first rotating camera 43, the second rotating camera 44, and the third rotating camera 42 may be rotated according to their respective circular or elliptical virtual rotation tracks through the rotations of their respective shafts, but only the third rotating camera 42 as a representative one is exemplarily illustrated in FIG. 3.

Figure 4:
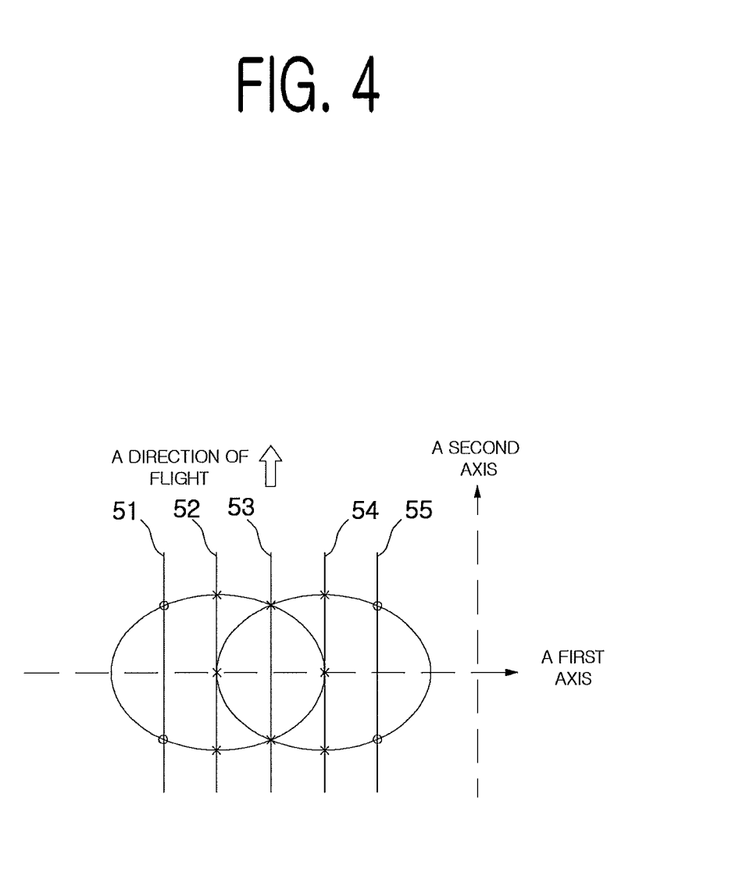
FIG. 4 illustrates virtual rotation tracks of two rotating cameras and virtual hetero straight lines and virtual homo straight lines created by referring to photograph-shooting points of the two rotating cameras in accordance with an example embodiment of the present invention.

FIG. 4 illustrates virtual rotation tracks of two rotating cameras and virtual hetero straight lines and virtual homo straight lines created by referring to photograph-shooting points of the two rotating cameras in accordance with an example embodiment of the present invention.

First of all, a first and a second axes are illustrated in FIG. 4 but they are virtual axes. The first axis means an axis in parallel with a virtual straight line connecting a rotation center located in a first virtual rotation track, i.e., an ellipse on the left in FIG. 4, assigned to a first rotating camera and a rotation center located in a second virtual rotation track, i.e., an ellipse on the right in FIG. 4, assigned to a second rotating camera; and the second axis means an axis in a direction vertical to the first axis. Besides, the control part 14 may control shots to be taken in X- and O-marked points in FIG. 4.

More specifically, in FIG. 4, the control part 14 may control the first and the second virtual rotation tracks to be partially overlapped with each other. At the time, the control part 14 may allow shots to be taken at two points where the first virtual rotation track and the second virtual rotation track are overlapped. If a straight line virtually connecting the two points is named as a virtual common hetero straight line 53, the control part 14 may control the virtual common hetero straight line 53 to be in parallel with the second axis.

Besides, if a virtual straight line connecting a photograph-shooting point 1-1 located in an interior of the second virtual rotation track among multiple photograph-shooting points on the first virtual rotation track shot by the first rotating camera with at least one photograph-shooting point among multiple photograph-shooting points on the second virtual rotation track shot by the second rotating camera is named as a first virtual hetero straight line 54, the control part 14 may control the first virtual hetero straight line 54 to be in parallel with the second axis.

Moreover, if a virtual straight line connecting a photograph-shooting point 2-1 located in an interior of the first virtual rotation track among multiple photograph-shooting points on the second virtual rotation track shot by the second rotating camera with at least one photograph-shooting point among multiple photograph-shooting points on the first virtual rotation track shot by the first rotating camera is named as a second virtual hetero straight line 52, the control part 14 may control the second virtual hetero straight line 52 to be in parallel with the second axis.

Additionally, if a virtual straight line connecting two photograph-shooting points (marked with O on the left in FIG. 4) among multiple photograph-shooting points on the first virtual rotation track shot by the first rotating camera is named as a first virtual homo straight line 51, the control part 14 may control the first virtual homo straight line 51 to be in parallel with the second axis. Herein, the first virtual homo straight line 51 would not include therein multiple photograph-shooting points on the second virtual rotation track.

Besides, if a virtual straight line connecting two photograph-shooting points (marked with O on the right in FIG. 4) among multiple photograph-shooting points on the second virtual rotation track shot by the second rotating camera is named as a second virtual homo straight line 55, the control part 14 may control the second virtual homo straight line 55 to be in parallel with the second axis. Herein, the second virtual homo straight line 55 would not include therein multiple photograph-shooting points on the first virtual rotation track.

As such, images shot at the photograph-shooting points marked with X in FIG. 4 may be collected and used to create a 3D image and those at the photograph-shooting points marked with O therein may be done to acquire a 2D image. More detailed explanation will be made with another example embodiment to be described later in FIG. 5.

The control part 14 may allow shots to be taken at photograph-shooting points marked with X and O. Given the marks X and O, it could be found that they form a grid shape.

Figure 5A:
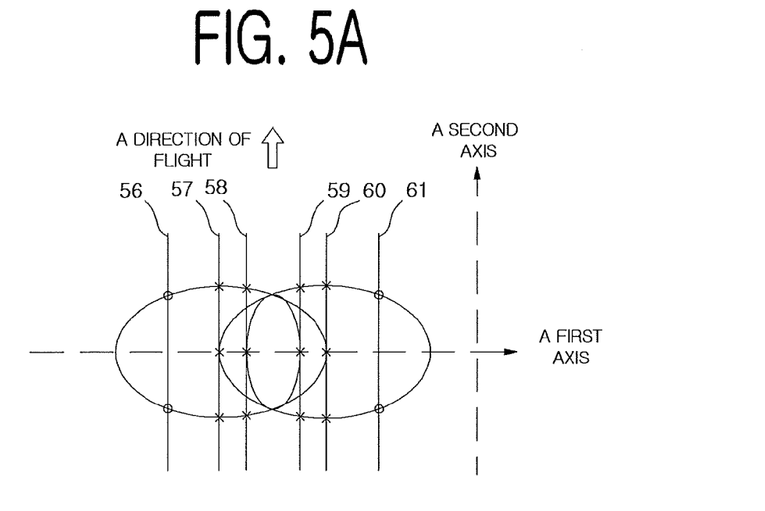
FIGS. 5A through 5C illustrate virtual rotation tracks of three rotating cameras and virtual hetero straight lines and virtual homo straight lines created by referring to photograph-shooting points of the three rotating cameras in accordance with an example embodiment of the present invention.
Figure 5B:
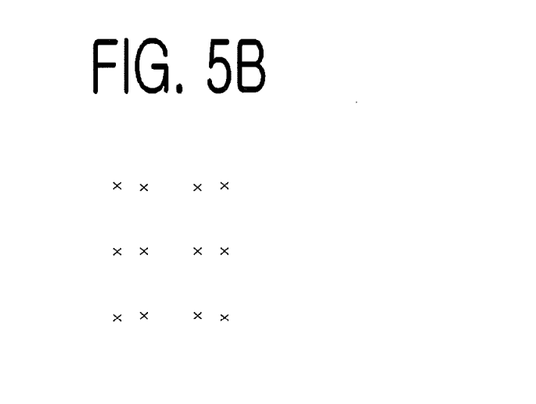
Figure 5C:
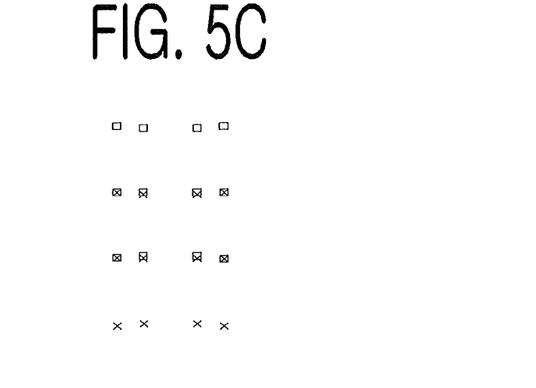

FIGS. 5A through 5C illustrate virtual rotation tracks of three rotating cameras and virtual hetero straight lines and virtual homo straight lines created by referring to photograph-shooting points of the three rotating cameras in accordance with an example embodiment of the present invention.

First of all, a first and a second axes are illustrated in FIG. 5A but they are virtual axes. The first axis means an axis in parallel with a virtual straight line connecting a rotation center located in a first virtual rotation track, i.e., an ellipse on the left in FIG. 5A, assigned to a first rotating camera and a rotation center located in a second virtual rotation track, i.e., an ellipse on the right in FIG. 5A, assigned to a second rotating camera; and the second axis means an axis in a direction vertical to the first axis. Besides, the control part 14 may control shots to be taken in X- and O-marked points in FIG. 5A. Additionally, a rotation center of a third virtual rotation track, i.e., an ellipse in center in FIG. 5A, of a third rotating camera may be located on a virtual straight line connecting the rotation center of the first virtual rotation track with that of the second virtual rotation track.

More specifically, in FIG. 5A, the control part 14 may control the third virtual rotation track of the third rotating camera to be included in an overlapped area between the interior of the first virtual rotation track and that of the second virtual rotation track, but it is not limited only to this.

Besides, if a virtual straight line connecting a photograph-shooting point 1-1 located in an interior of the second virtual rotation track among multiple photograph-shooting points on the first virtual rotation track shot by the first rotating camera with at least one photograph-shooting point among multiple photograph-shooting points on the second virtual rotation track shot by the second rotating camera is named as a first virtual hetero straight line 60, the control part 14 may control the first virtual hetero straight line 60 to be in parallel with the second axis.

Moreover, if a virtual straight line connecting a photograph-shooting point 2-1 located in an interior of the first virtual rotation track among multiple photograph-shooting points on the second virtual rotation track shot by the second rotating camera with at least one photograph-shooting point among multiple photograph-shooting points on the first virtual rotation track shot by the first rotating camera is named as a second virtual hetero straight line 57, the control part 14 may control the second virtual hetero straight line 57 to be in parallel with the second axis.

Moreover, if a virtual straight line connecting a photograph-shooting point 3-1 (which is close to the photograph-shooting point 2-1) among multiple photograph-shooting points on the third virtual rotation track and at least one photograph-shooting point among multiple photograph-shooting points on the first virtual rotation track shot by the first rotating camera is named as a 3-1 virtual hetero straight line 58, the control part 14 may control the 3-1 virtual hetero straight line 58 to be in parallel with the second axis. In addition, if a virtual straight line connecting a photograph-shooting point 3-2 (which is close to the photograph-shooting point 1-1) among multiple photograph-shooting points on the third virtual rotation track and at least one photograph-shooting point among multiple photograph-shooting points on the second virtual rotation track shot by the second rotating camera is named as a 3-2 virtual hetero straight line 59, the control part 14 may control the 3-2 virtual hetero straight line 59 to be in parallel with the second axis.

Herein, images acquired at photograph-shooting points on the first virtual hetero straight line 60, the second virtual hetero straight line 57, the 3-1 virtual hetero straight line 58, and the 3-2 virtual hetero straight line 59 could be used to implement a 3D image. More detailed explanation will be made below by referring to FIGS. 5B and 5C.

It is made sure that FIG. 5B which shows photograph-shooting points, at the time when the aerial vehicle is located at a first location during a flight, as X marks with the relative location relationships among the X-marked points in FIG. 5A being slightly enlarged while the relative location relationships are kept as they are.

By referring to FIG. 5B, it could be found that the control part 14 acquires images of the subject by allowing shots to be taken at photograph-shooting points on the first virtual hetero straight line 60, the second virtual hetero straight line 57, the 3-1 virtual hetero straight line 58, and the 3-2 virtual hetero straight line 59.

Next, FIG. 5C which shows photograph-shooting points, at the time when the aerial vehicle is located at a second location during the flight, as square marks with the relative location relationships to be identified at a glance by making the square-marked points overlap with the x-marked points in FIG. 5B. Herein, the second location is a location where the aerial vehicle has flown for a certain period of time from the first location. As such, as the aerial vehicle moves, data on multiple images shot at several angles at the respective photograph-shooting points could be acquired and a 3D image could be created by referring to the accumulated image data as the aerial vehicle moves.

More specifically, in FIG. 5C, it could be found that, if the aerial vehicle reaches the second location, the control part 14 acquires the images of the subject by allowing shots to be taken at the photograph-shooting points on the first virtual hetero straight line 60, the second virtual hetero straight line 57, the 3-1 virtual hetero straight line 58, and the 3-2 virtual hetero straight line 59 (marking with square).

Additionally, if a virtual straight line connecting two photograph-shooting points (marked with O on the left in FIG. 5A) among multiple photograph-shooting points on the first virtual rotation track shot by the first rotating camera is named as a first virtual homo straight line 56, the control part 14 may control the first virtual homo straight line 56 to be in parallel with the second axis. Herein, the first virtual homo straight line 56 would not include therein multiple photograph-shooting points on the second and the third virtual rotation tracks.

Besides, if a virtual straight line connecting two photograph-shooting points (marked with O on the right in FIG. 5A) among multiple photograph-shooting points on the second virtual rotation track shot by the second rotating camera is named as a second virtual homo straight line 61, the control part 14 may control the second virtual homo straight line 61 to be in parallel with the second axis. Herein, the second virtual homo straight line 61 would not include therein multiple photograph-shooting points on the first and the third virtual rotation tracks.

Images acquired at the photograph-shooting points on the first virtual homo straight line 56 and the second virtual homo straight line 61 could be used to implement a 2D image(s).

As such, images shot at points marked with X in FIG. 5A may be collected and used to create a 3D image(s) and those at points marked with O therein may be done to acquire a 2D image(s).

The control part 14 may allow shots to be taken at photograph-shooting points marked with X and O. Given the marks X and O, it could be found that they form a grid shape.

The above explanation was made on assumption that the group of rotating cameras 12 includes two or three rotating cameras, but it is not limited to this. Even on assumption that the group includes four or more rotating cameras, if the functions of the control part 14 as explained above are implemented, it could be within the claim scope of the present invention.

In accordance with the present invention, a 3D image could be acquired by using the group of rotating cameras on the aerial vehicle during a relatively short endurance flight and more information on images created in such a method could be estimated.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:
1. An imaging system on an aerial vehicle, comprising:
a group of rotating camera including at least a first and a second rotating cameras on the aerial vehicle; and
a control part which controls a first virtual rotation track of the first rotating camera and a second virtual rotation track of the second rotating camera so as to partially overlap with each other and allows shots to be taken at multiple photograph-shooting points on the first virtual rotation track by the first rotating camera and at multiple photograph-shooting points on the second virtual rotation track by the second rotating camera;
wherein the control part controls the first rotating camera and the second rotating camera to make a shape of the first virtual rotation track of the first rotating camera be similar to that of the second virtual rotation track of the second rotating camera, wherein the control part controls a set of multiple photograph-shooting points on the first virtual rotation track where shooting is made by the first rotating camera and those on the second virtual rotation track where shooting is done by the second rotating camera, and wherein the multiple photograph-shooting points on the first virtual rotation track and those on the second virtual rotation track form a substantially grid shape.

2. The system of claim 1, wherein, on the assumption that a center of rotation in the first virtual rotation track and a center of rotation in the second virtual rotation track are placed on a virtual first axis and a virtual second axis is perpendicular to the virtual first axis, if a virtual straight line connecting a photograph-shooting point 1-1 located in an interior of the second virtual rotation track among multiple photograph-shooting points on the first virtual rotation track shot by the first rotating camera with at least one photograph-shooting point among multiple photograph-shooting points on the second virtual rotation track shot by the second rotating camera is named as a first virtual hetero straight line, the control part may control the first virtual hetero straight line to be in parallel with the second axis; and if a virtual straight line connecting a photograph-shooting point 2-1 located in an interior of the first virtual rotation track among multiple photograph-shooting points on the second virtual rotation track shot by the second rotating camera with at least one photograph-shooting point among multiple photograph-shooting points on the first virtual rotation track shot by the first rotating camera is named as a second virtual hetero straight line, the control part may control the second virtual hetero straight line to be in parallel with the second axis.

3. The system of claim 2, wherein the control part allows shots to be taken at two points where the first virtual rotation track and the second virtual rotation track are overlapped; and wherein, if a straight line virtually connecting the two points is named as a virtual common hetero straight line, the control part controls the virtual common hetero straight line to be in parallel with the second axis.

4. The system of claim 3, wherein the first and the second virtual rotation tracks are circular or elliptical shape.

5. The system of claim 1, wherein the group of rotating camera further includes at least a third rotating camera; and wherein the control part controls a third virtual rotation track of the third rotating camera to be overlapped with at least part of the first and the second virtual rotation tracks and additionally allows shots to be taken by the third rotating camera at multiple photograph-shooting points on the third virtual rotation track.

6. The system of claim 5, wherein, on the assumption that the center of rotation in the first virtual rotation track, the center of rotation in the second virtual rotation track, and a center of rotation in the third virtual rotation track are placed on the virtual first axis, (i) if a virtual straight line connecting a photograph-shooting point 1-1 located in an interior of the second virtual rotation track among multiple photograph-shooting points on the first virtual rotation track shot by the first rotating camera with at least one photograph-shooting point among multiple photograph-shooting points on the second virtual rotation track shot by the second rotating camera is named as a first virtual hetero straight line, the control part controls the first virtual hetero straight line to be in parallel with the second axis, (ii) if a virtual straight line connecting a photograph-shooting point 2-1 located in an interior of the first virtual rotation track among multiple photograph-shooting points on the second virtual rotation track shot by the second rotating camera with at least one photograph-shooting point among multiple photograph-shooting points on the first virtual rotation track shot by the first rotating camera is named as a second virtual hetero straight line, the control part controls the second virtual hetero straight line to be in parallel with the second axis, (iii) if a virtual straight line connecting a photograph-shooting point 3-1 among multiple photograph-shooting points on the third virtual rotation track and at least one photograph-shooting point among multiple photograph-shooting points on the first virtual rotation track shot by the first rotating camera is named as a 3-1 virtual hetero straight line, the control part controls the 3-1 virtual hetero straight line to be in parallel with the second axis, and (iv) if a virtual straight line connecting a photograph-shooting point 3-2 among multiple photograph-shooting points on the third virtual rotation track and at least one photograph-shooting point among multiple photograph-shooting points on the second virtual rotation track shot by the second rotating camera is named as a 3-2 virtual hetero straight line, the control part controls the 3-2 virtual hetero straight line to be in parallel with the second axis.

7. The system of claim 6, wherein images acquired at photograph-shooting points on the first virtual hetero straight line, the second virtual hetero straight line, the 3-1 virtual hetero straight line, and the 3-2 virtual hetero straight line are used to implement a 3D image.

8. The system of claim 7, wherein, if images of the subject are acquired by allowing shots to be taken at photograph-shooting points on the first virtual hetero straight line, the second virtual hetero straight line, the 3-1 virtual hetero straight line, and the 3-2 virtual hetero straight line at the time when the aerial vehicle is located at a first location during a flight and if images of the subject are acquired by allowing shots to be taken at photograph-shooting points on the first virtual hetero straight line, the second virtual hetero straight line, the 3-1 virtual hetero straight line, and the 3-2 virtual hetero straight line at the time when the aerial vehicle is located at a second location during the flight, the second location being a location where the aerial vehicle has flown for a certain period of time from the first location, a 3D image is implemented by referring to the images acquired from the first and the second locations.

9. The system of claim 6, wherein, if a virtual straight line connecting two photograph-shooting points among multiple photograph-shooting points on the first virtual rotation track shot by the first rotating camera is named as a first virtual homo straight line, the control part controls the first virtual homo straight line to be in parallel with the second axis and the first virtual homo straight line does not include therein multiple photograph-shooting points on the second and the third virtual rotation tracks; and wherein, if a virtual straight line connecting two photograph-shooting points among multiple photograph-shooting points on the second virtual rotation track shot by the second rotating camera is named as a second virtual homo straight line, the control part controls the second virtual homo straight line to be in parallel with the second axis and the second virtual homo straight line does not include therein multiple photograph-shooting points on the first and the third virtual rotation tracks.

10. The apparatus of claim 9, wherein images acquired at the photograph-shooting points on the first virtual homo straight line and the second virtual homo straight line are used to implement a 2D image.

11. The system of claim 5, wherein the third virtual rotation track as a virtual rotation track covered by rotation of the third rotating camera is controlled to be included in an overlapped area between the interior of the first virtual rotation track and that of the second virtual rotation track.

* * * * *